United States Patent
Cho et al.

(10) Patent No.: US 10,010,835 B2
(45) Date of Patent: Jul. 3, 2018

(54) ASYMMETRIC MEMBRANES AND RELATED METHODS

(71) Applicant: 3M Innovative Properties Company, St. Paul, MN (US)

(72) Inventors: Kwantai Cho, Charlotte, NC (US); J. Clifton DeLozier, Fort Mill, SC (US)

(73) Assignee: 3M Innovative Properties Company, St. Paul, MN (US)

( * ) Notice: Subject to any disclaimer, the term of this patent is extended or adjusted under 35 U.S.C. 154(b) by 398 days.

(21) Appl. No.: 14/645,972

(22) Filed: Mar. 12, 2015

(65) Prior Publication Data
US 2015/0258500 A1 Sep. 17, 2015

Related U.S. Application Data

(60) Provisional application No. 61/952,180, filed on Mar. 13, 2014.

(51) Int. Cl.
*B01D 69/08* (2006.01)
*B01D 71/26* (2006.01)
(Continued)

(52) U.S. Cl.
CPC ........... *B01D 69/088* (2013.01); *B01D 71/26* (2013.01); *B29C 47/0057* (2013.01);
(Continued)

(58) Field of Classification Search
CPC ............ B01D 67/0027; B01D 67/0083; B01D 67/0086; B01D 69/08; B01D 69/088;
(Continued)

(56) References Cited

U.S. PATENT DOCUMENTS 4,415,608 A * 11/1983 Epperson ............... B01D 69/12
156/244.24
4,440,643 A * 4/1984 Makino ................. B01D 69/12
210/500.23
(Continued)

FOREIGN PATENT DOCUMENTS

| EP | 1 052 011 | 11/2000 |
|---|---|---|
| JP | 5-137980 | 6/1993 |
| JP | 2942867 B2 | 8/1999 |
| WO | WO 02-15299 A1 | 2/2002 |

OTHER PUBLICATIONS

Twarowska-Schmidt, Krystyna et al., "Melt-spun asymmetric poly(4-methyl-1-pentene) hollow fibre membranes", Journal of Membrane Science, 137, 1997, pp. 55-61.*

*Primary Examiner* — Jason M Greene
(74) *Attorney, Agent, or Firm* — Scott A. Baum

(57) ABSTRACT

Microporous polymer membranes and related methods of fabrication are provided. An asymmetric microporous membrane embodiment includes, but is not limited to, a thermoplastic polymer substrate defining a plurality of micropores, the thermoplastic polymer including one or more of polyethylene (PE), polypropylene (PP), polymethylpentene (PMP), and a combination thereof; and a polymethylpentene (PMP) polymer skin positioned on the thermoplastic polymer substrate, wherein when the thermoplastic polymer substrate includes PMP, the PMP polymer skin has a crystallinity that differs from a crystallinity of the PMP in the polymer substrate.

15 Claims, 3 Drawing Sheets

(51) Int. Cl.
*B29C 47/06* (2006.01)
*B29C 47/00* (2006.01)
*B29C 71/02* (2006.01)
*B29K 23/00* (2006.01)
*B29L 9/00* (2006.01)
*B29L 31/00* (2006.01)

(52) U.S. Cl.
CPC ............ *B29C 47/065* (2013.01); *B29C 71/02* (2013.01); *B29C 2071/022* (2013.01); *B29K 2023/04* (2013.01); *B29K 2023/10* (2013.01); *B29K 2023/16* (2013.01); *B29L 2009/00* (2013.01); *B29L 2031/755* (2013.01)

(58) Field of Classification Search
CPC .... B01D 69/12; B01D 71/26; B29C 47/0057; B29C 47/065
See application file for complete search history.

(56) References Cited

U.S. PATENT DOCUMENTS

| | | | | |
|---|---|---|---|---|
| 4,664,681 | A | * | 5/1987 | Anazawa ........... B01D 67/0027 264/176.1 |
| 4,874,399 | A | * | 10/1989 | Reed .................. B01D 39/1623 55/527 |
| 4,931,181 | A | * | 6/1990 | Blume .................. B01D 69/12 210/500.27 |
| 6,379,796 | B1 | | 4/2002 | Uenishi et al. |
| 7,300,571 | B2 | * | 11/2007 | Cote ..................... B01D 63/02 210/151 |
| 2009/0274955 | A1 | | 11/2009 | Kikuchi et al. |
| 2012/0077073 | A1 | | 3/2012 | Ishihara et al. |
| 2015/0051308 | A1 | * | 2/2015 | Kano .................... D01D 5/247 521/138 |

* cited by examiner

ASYMMETRIC MEMBRANES AND RELATED METHODS

CROSS-REFERENCE TO RELATED APPLICATIONS

The present application claims priority to and the benefit of U.S. Provisional Application Ser. No. 61/952,180, filed Mar. 13, 2014, which is hereby incorporated by reference in its entirety.

FIELD OF THE INVENTION

In accordance with at least selected embodiments, aspects or objects, asymmetric membranes and/or related methods of production and/or use are provided. In accordance with at least certain embodiments, aspects or objects, microporous polymer membranes and related methods of fabrication are provided. An exemplary asymmetric microporous membrane embodiment includes, but is not limited to, a thermoplastic polymer substrate defining a plurality of micropores, the thermoplastic polymer including one or more of polyethylene (PE), polypropylene (PP), polymethylpentene (PMP), and a combination thereof; and a polymethylpentene (PMP) polymer skin positioned on the thermoplastic polymer substrate, wherein when the thermoplastic polymer substrate includes PMP, the PMP polymer skin has a crystallinity that differs from a crystallinity of the PMP in the polymer substrate. A possibly preferred exemplary asymmetric microporous membrane embodiment is a hollow fiber asymmetric microporous membrane.

BACKGROUND

Membrane separators can be utilized to separate components from a flow stream on the basis of size, phase, charge, and so forth. Microporous membranes often employ materials having a certain porosity and pore size on the order of microns, and can have many uses including, for example, separation, filtration, diffusion, and barrier applications. These broad applications have been practically applied in medical devices, electrochemical devices, chemical processing devices, pharmaceutical devices, water purification, to name a few. The functionality of a microporous membrane is often a complex function of particular application, the structure (e.g., strength, pore size, porosity, pore tortuosity and thickness of the membrane), and the composition or chemical nature of the membrane. Often times, these and other variables of the membrane must be tailored to the particular application.

SUMMARY

In accordance with at least selected embodiments, aspects or objects, asymmetric membranes and/or related methods of production and/or use are provided. In accordance with at least certain embodiments, aspects or objects, microporous polymer membranes and related methods of fabrication are provided. An exemplary asymmetric microporous membrane embodiment includes, but is not limited to, a thermoplastic polymer substrate defining a plurality of micropores, the thermoplastic polymer including one or more of polyethylene (PE), polypropylene (PP), polymethylpentene (PMP), and a combination thereof; and a polymethylpentene (PMP) polymer skin positioned on the thermoplastic polymer substrate, wherein when the thermoplastic polymer substrate includes PMP, the PMP polymer skin has a crystallinity that differs from a crystallinity of the PMP polymer substrate. A possibly preferred exemplary asymmetric microporous membrane embodiment is a hollow fiber asymmetric microporous membrane.

An asymmetric membrane is described that includes a polymethylpentene (PMP) skin positioned on a porous substrate. In implementations, the substrate includes PMP having a crystallinity that differs from that of the PMP skin. In other implementations, the substrate includes a material that differs from PMP, including, but not limited to, one or more of polyethylene (PE), polypropylene (PP), or combinations thereof. In further implementations, the substrate includes one or more of PMP having a crystallinity that differs from that of the PMP skin, PE, PP, or combinations thereof.

A method embodiment includes, but is not limited to, providing a polymethylpentene (PMP) polymer skin resin and a substrate resin, the substrate resin including one or more of polyethylene (PE), polypropylene (PP), polymethylpentene (PMP), and a combination thereof; co-extruding the PMP polymer skin resin and the substrate resin to form a membrane precursor; and stretching the membrane precursor to form an asymmetric microporous membrane having a PMP polymer skin on a thermoplastic polymer substrate.

This Summary is provided to introduce a selection of concepts in a simplified form, which concepts are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Microporous membranes can be fabricated according to various production techniques, such as the wet process, the dry-stretch process (also known as the CELGARD process), and the particle stretch process. Generally, in the wet process, (also known as the phase inversion process, the extraction process, or the TIPS process), a polymeric raw material is mixed with an oil, a processing oil, a solvent, and/or another material, this mixture is extruded, and pores are then formed when such an oil, processing oil, solvent, and/or other material is removed. These films may be stretched before or after the removal of the oil, solvent, and/or other material. Generally, in the particle stretch process, the polymeric raw material is mixed with particulate, this mixture is extruded, and pores are formed during stretching when the interface between the polymer and the particulate fractures due to the stretching forces. The dry process differs from the wet process and the particle stretch process by producing a porous membrane typically without addition of a processing oil, oil, solvent, plasticizer, and/or the like, or particulate material. Generally, the dry-stretch process refers to a process where pore formation results from stretching a nonporous precursor.

While membranes made by the dry-stretch process have met with excellent commercial success, there is a need to improve their physical attributes, so that they may be used in a wider spectrum of applications. Accordingly, an asymmetric membrane is described that includes a polymethylpentene (PMP) skin positioned on a porous substrate to provide functionality that may be suitable, for example, as battery separators (useful in consumer electronics applications and electric vehicle or hybrid electric vehicle applications), in blood oxygenation applications, blood filtering applications, various applications where a liquid needs to be degassed, as well as ink jet printing applications for debubbling or degassing ink, and may be well suited for use in hollow fiber membrane contactors or modules.

Example Implementations

Figure 1A:
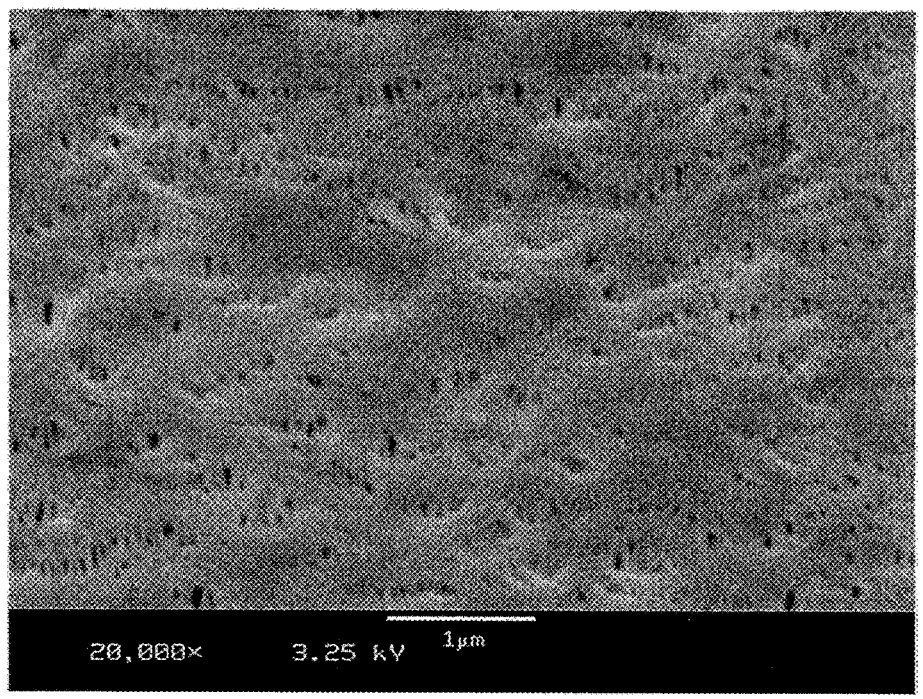
FIGS. 1A and 1B are images of a substrate material in accordance with example implementations of the present disclosure.
Figure 1B:
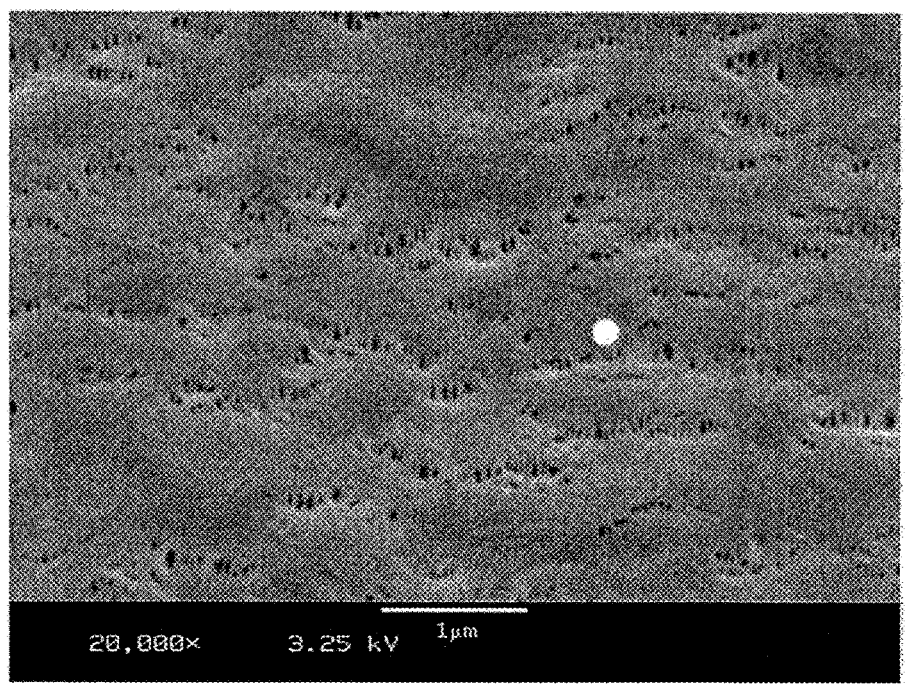

A microporous membrane can generally be described as a thin, pliable, polymeric sheet, foil, or film having a plurality of pores through at least a portion of the membrane, which can be formed as a hollow fiber, a flat sheet, a multi-layered (or multi-ply) sheet, and so forth. The membrane can be constructed of a variety of materials, including but not limited to, thermoplastic polymers, such as polyolefins. In an example implementation, a microporous membrane includes a polymethylpentene (PMP) skin positioned on a porous substrate. Images of example porous substrates are provided in FIGS. 1A and 1B, each shown with a stated magnification of 20,000×.

In various implementations that include multi-layered microporous membranes, the PMP skin may be positioned as any layer of the multi-layered microporous membrane; for example, the PMP skin may make up one or more outer and/or inner layers of a multi-layered microporous membrane comprising multiple layers, for example, three or more layers. Additionally, for a hollow fiber microporous membrane, the PMP skin may be positioned on the shell side or the lumen side of such a hollow fiber microporous membrane.

The microporous membrane can be an asymmetric membrane, where the PMP skin differs from the substrate according to one or more physical characteristics. For example, each of the skin and the substrate can be formed from a PMP resin, but the crystallinity of each of the skin and the substrate differs resulting in a non-homogenous membrane. In an example implementation, the PMP resin for the skin has a crystallinity of about 40% or less than 40%, whereas the PMP resin for the substrate has a crystallinity of about 40% or more, for example, a crystallinity of about 60% or more. The crystallinity of the PMP influences the porosity of the material, where a higher crystallinity may yield a more porous membrane as compared to a lower crystallinity. Correspondingly, the porosity of the material can affect the permeability of the membrane with respect to solid materials, liquid materials, and gaseous materials. In implementations, the physical characteristics of the PMP skin and the substrate can differ on the basis of the polyolefin(s) used to form the skin and substrate. For example, where the skin is formed from PMP, the substrate can be formed from one or more of polyethylene (PE), polypropylene (PP), or combinations thereof. In further implementations, the substrate includes one or more of PMP having a crystallinity that differs from that of the PMP skin, PE, PP, or combinations thereof. The gas permeability of the PMP skin may be a benefit or advantage of the membranes described herein. By way of example only, in some implementations, the PMP skin may gas and/or degas a liquid efficiently even though it is not permeable to liquids. Additionally, the temperature stability of the membranes described herein may be improved relative to other known membranes, as the melting point of the PMP skin resin may add temperature stability to the membrane. Further, a membrane formed from a PMP skin layer and a PE or PP microporous substrate layer may provide the benefit of having higher gas permeability than other membranes because of the high porosity of the microporous substrate. In various implementations described herein, a microporous substrate may be used that has a porosity of more than 20%, or more than 25%, or more than 35%, or more than 40%.

Figure 2A:
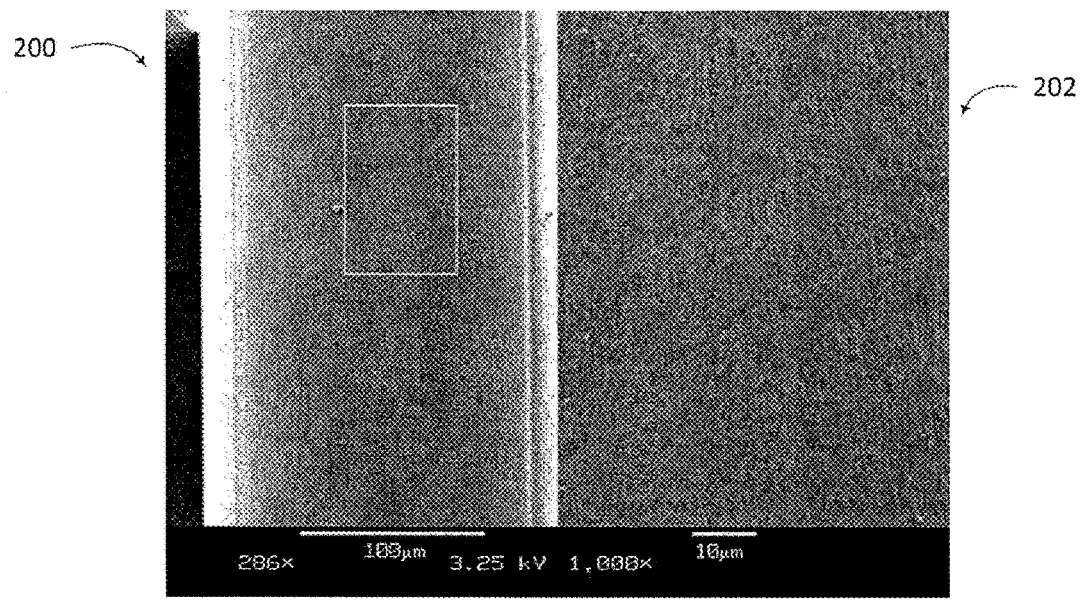
FIGS. 2A and 2B are images of a PMP skin positioned on a substrate material in accordance with example implementations of the present disclosure.
Figure 2B:
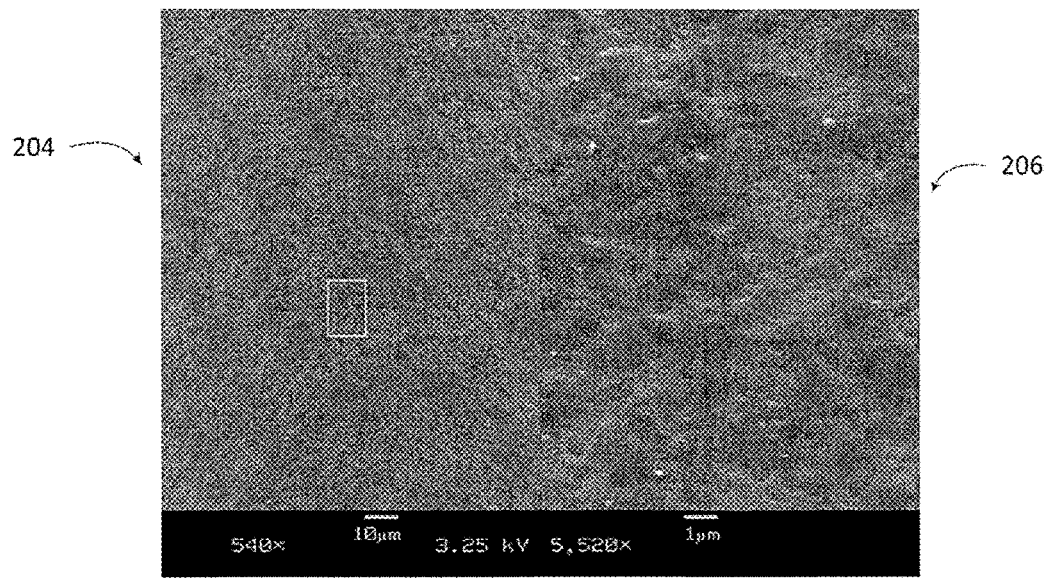
Figure 3:
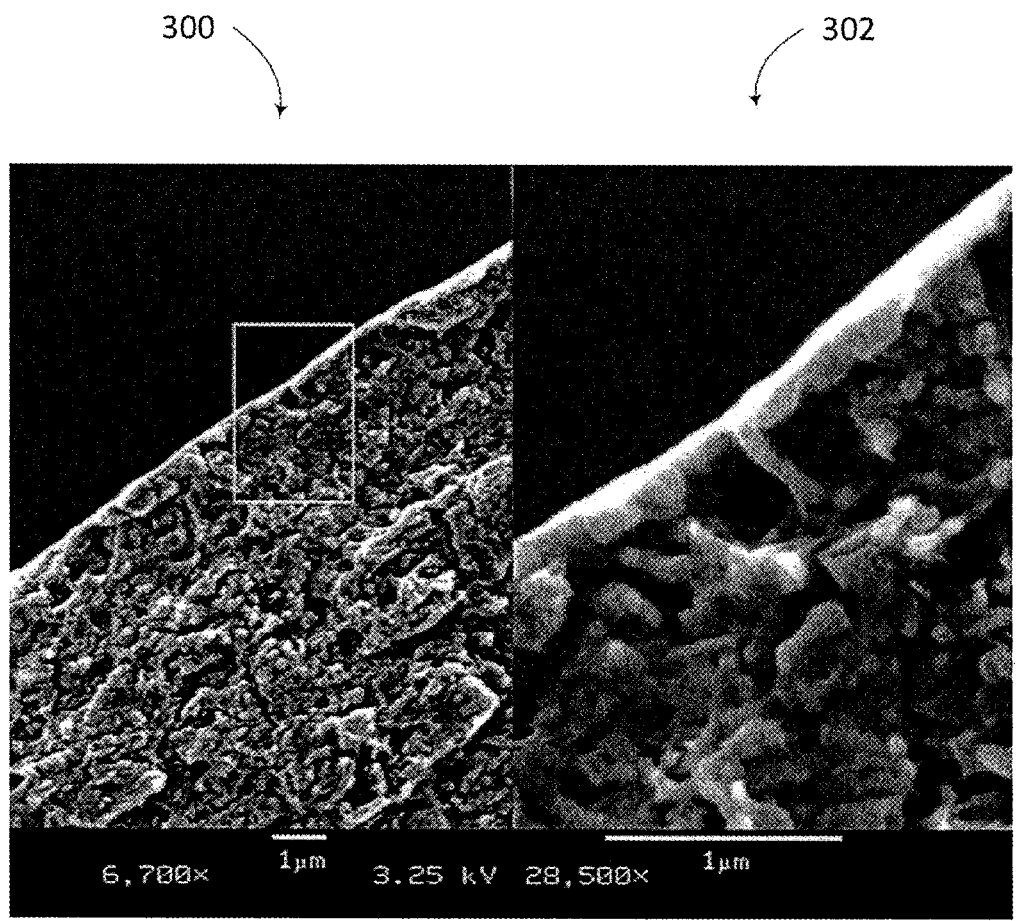
FIG. 3 is an image of a cross section of a PMP skin positioned on a substrate material in accordance with example implementations of the present disclosure.

The PMP skin may be a nonporous skin, such as a solid skin without pores (or a skin without permeability to liquids but with permeability to gases) that is positioned on a microporous substrate. Images of example nonporous skins are provided in FIGS. 2A and 2B. FIG. 2A provides a first image 200 of an example nonporous skin on a porous substrate at a stated magnification of 286×, and a second image 202 which is a magnified section of image 200 at a stated magnification of 1,000×. FIG. 2B provides a first image 204 of an example nonporous skin on a porous substrate at a stated magnification of 540×, and a second image 206 which is a magnified section of image 204 at a stated magnification of 5,520×. As can be seen, the PMP skin is substantially free from defects. The precision of the PMP skin can be attributed to the dry-stretch process (or CELGARD process) by which the instant microporous membranes are produced, as described further herein. The thickness of the PMP skin and the substrate can depend on the particular application in which the microporous membrane is employed. In example implementations, the PMP skin may be 2 microns or less in thickness, or 1 micron or less in thickness, or 0.5 microns or less in thickness, or approximately 0.25 microns thick. In various implementations, decreasing the thickness of the PMP skin results in a more efficient asymmetric microporous membrane. In various implementations, the substrate may have a thickness in the range of 10-150 µm, of 30-75 µm, of 20-40 µm, of 40-50 µm, or of 45-55 µm. In some implementations, the substrate may have an even lower thickness in the range of 5-10 µm (for example, in various film and/or flat-sheet implementations). FIG. 3 provides images of a cross-section of an example microporous membrane having a nonporous PMP skin positioned on a microporous substrate, where a first image 300 is provided at a stated magnification of 6,700× and a second image 302 is provided at a stated magnification of 28,500×.

In an example implementation, a microporous membrane includes the following characteristics: oxygen ($O_2$) permeability of 0.08 cc/(min-cm$^2$-bar), oxygen/nitrogen ($O_2/N_2$) separation factor of between 3 and 4 (e.g., 3.5), PMP skin thickness of 0.25-0.5 microns, porosity of about 25% (porosity of the overall asymmetric microporous membrane), a fiber outer diameter (OD) of 300 microns, a fiber wall thickness of 30-50 microns, and a total coverage (e.g., 100%) of PMP skin over the substrate.

Example Fabrication Methods

The microporous membranes described herein can be fabricated from various production methods depending on the desired membrane structure (e.g., hollow-fiber, flat sheet, a multi-layered (or multi-ply) sheet, and so forth) and the desired membrane composition. In general, the microporous membranes are formed via the CELGARD process, also referred to as the "extrude, anneal, stretch" or "dry stretch" process, whereby a semi-crystalline polymer is extruded to provide a membrane precursor and a porosity is induced in the microporous substrate by stretching the extruded precursor. No porosity, however, is induced in the PMP skin layer in various implementations described herein, because of the low crystallinity of the material used to make such layer. No solvents or phase inversion are used in the CELGARD process to form the membrane. An example method of making a microporous membrane includes the steps of providing a polymethylpentene (PMP) resin and a substrate resin; co-extruding the PMP resin and the substrate resin to form a membrane precursor; and stretching the membrane precursor to form a membrane having a PMP skin on a substrate. The substrate resin can include one or more of PMP having a crystallinity that differs from that of the PMP skin, polyethylene (PE), polypropylene (PP), or combinations thereof. In various implementations, polypropylene is used and may be a polypropylene homopolymer and/or an isotactic polypropylene. Such polypropylene may, in some instances, have a density greater than 0.8 g/cc, or greater than 0.85 g/cc, or greater than 0.9 g/cc. In various implementations, polyethylene is used and may be a polyethylene homopolymer and/or a high density polyethylene. Such polyethylene may, in some instances, have a density greater than 0.9 g/cc, or greater than 0.93 g/cc, or greater than 0.94 g/cc, or greater than 0.95 g/cc.

The method can also include a step of annealing the membrane precursor prior to the stretching step. In an example implementation, the annealing step may include heating the membrane precursor at a temperature of about 150° C. for about 10 minutes.

The step of co-extruding the PMP resin and the substrate resin to form a membrane precursor can include extruding the PMP resin and the substrate resin through a co-extrusion die to form a PMP skin layer on a substrate layer. The co-extrusion die can be configured based on the desired thicknesses of the PMP skin layer and the substrate layer, where, in example implementations, the substrate layer is thicker than the PMP skin layer. For example, the PMP skin can be co-extruded to have a post-stretch thickness of 2 microns or less in thickness, or 1 micron or less in thickness, or 0.5 microns or less in thickness, or approximately 0.25 microns where the substrate can be co-extruded have a post-stretch thickness in the range of 10-150 μm, of 30-75 μm, of 20-40 μm, of 40-50 μm, or of 45-55 μm. In some implementations, the substrate may have an even lower thickness in the range of 5-10 μm (for example, in various film and/or flat-sheet implementations).

Another example method includes a method of making an asymmetric membrane having a PMP skin and a porous polymer substrate as described herein, which can include the steps of: providing a polymethylpentene (PMP) resin and a substrate resin; co-extruding the PMP resin and the substrate resin to form a membrane precursor; and stretching the membrane precursor to form an asymmetric microporous membrane having a PMP skin on a substrate. The substrate resin can include one or more of PMP having a crystallinity that differs from that of the PMP skin, polyethylene (PE), polypropylene (PP), or combinations thereof. The method can also include a step of annealing the membrane precursor prior to the stretching step.

Another example method includes a method of making a hollow fiber asymmetric membrane having a PMP skin and a porous polymer substrate as described above, which can include the steps of: providing a polymethylpentene (PMP) resin and a substrate resin; co-extruding the PMP resin and the substrate resin to form a hollow fiber membrane precursor; stretching the hollow fiber membrane precursor to form a hollow fiber membrane comprising PMP skin on a substrate. The substrate resin can include one or more of PMP having a crystallinity that differs from that of the PMP skin, polyethylene (PE), polypropylene (PP), or combinations thereof. The method can also include a step of annealing the hollow fiber membrane precursor prior to the stretching step.

Example 1

Microporous membranes were fabricated utilizing various extrusion process conditions: spin temperature of 270-315° C., quench height of 1-5 inches, draw down of 200-500, extrusion speed of 100-300 m/min, quench chamber of 0-20 inches, a passive quench heated quench chamber from no heat to 120° C., an active quench heated quench chamber with a quench ring at 1.5-20 inches from spinneret. A particular example membrane was fabricated having the following extrusion conditions: spin temperature of 310° C., drawn down of 500, quench height of 3 inches, extrusion speed of 100 m/min. Annealing conditions were examined for the microporous membranes, with temperatures ranging from no annealing to 220° C., and with time ranges from 10 minutes to 6 hours. In an example implementation, the annealing conditions included a temperature of 150° C. for 10 minutes.

In accordance with at least selected embodiments, aspects or objects, asymmetric membranes and/or related methods of production and/or use are provided. In accordance with at least certain embodiments, aspects or objects, microporous polymer membranes and related methods of fabrication are provided. An exemplary asymmetric microporous membrane embodiment includes, but is not limited to, a thermoplastic polymer substrate defining a plurality of pores or micropores, the thermoplastic polymer including one or more of polyethylene (PE), polypropylene (PP), polymethylpentene (PMP), and a combination thereof; and a polymethylpentene (PMP) polymer skin positioned on the thermoplastic polymer substrate, wherein when the thermoplastic polymer substrate includes PMP, the PMP polymer skin preferably has a crystallinity that differs from a crystallinity of the PMP in the polymer substrate. The preferred PMP skin may be non-porous or less porous than the thermoplastic polymer substrate. A possibly preferred exemplary asymmetric microporous membrane embodiment is a hollow fiber asymmetric microporous membrane. A possibly more preferred exemplary asymmetric microporous membrane embodiment is a co-extruded, multi-layered, hollow fiber asymmetric microporous membrane.

While the invention has been described in detail, modifications within the spirit and scope of the invention will be readily apparent to those of skill in the art. In addition, it should be understood that objects or aspects of the invention and portions of various embodiments may be combined or interchanged either in whole or in part. Furthermore, those of ordinary skill in the art will appreciate that the foregoing description is by way of example only, and is not intended to limit the invention.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

What is claimed is:

1. A method of making an asymmetric microporous membrane comprising:
providing a polymethylpentene (PMP) polymer skin resin and a substrate resin, the substrate resin including one or more of polyethylene (PE), polypropylene (PP), polymethylpentene (PMP), and a combination thereof;
co-extruding the PMP polymer skin resin and the substrate resin to form a membrane precursor; and
stretching the membrane precursor to form an asymmetric microporous membrane having a PMP polymer skin on a thermoplastic polymer substrate; and
wherein co-extruding the PMP polymer skin resin and the substrate resin to form a membrane precursor includes co-extruding the PMP polymer skin resin and the substrate resin through a co-extrusion die to form the membrane precursor.

2. The method of claim 1, wherein providing a polymethylpentene (PMP) polymer skin resin and a substrate resin includes providing the PMP polymer skin resin and the substrate resin exclusive of any oils for subsequent removal to form pores or any pore-forming particulate to facilitate pore formation.

3. The method of claim 1, wherein the substrate resin includes polymethylpentene (PMP).

4. The method of claim 3, wherein PMP polymer skin has a crystallinity that is less than a crystallinity of the PMP of the substrate resin.

5. The method of claim 4, wherein the crystallinity of the PMP polymer skin resin is less than about 40%, and wherein the crystallinity of the PMP of the substrate resin is greater than about 40%.

6. The method of claim 4, wherein the crystallinity of the PMP of the substrate resin is greater than about 60%.

7. The method of claim 1, wherein the PMP polymer skin has a thickness of less than about 2 microns.

8. The method of claim 1, wherein the thermoplastic polymer substrate has a thickness of less than about 150 microns.

9. The method of claim 1, wherein the asymmetric microporous membrane is a non-homogeneous membrane.

10. The method of claim 1, further including annealing the membrane precursor.

11. The method of claim 10, wherein annealing the membrane precursor includes annealing the membrane precursor prior to stretching the membrane precursor.

12. A method of making a multi-layered membrane comprising the method of making an asymmetric microporous membrane of claim 1, wherein the PMP polymer skin comprises an outer layer and/or an inner layer of the multi-layered membrane.

13. A method of making an asymmetric microporous hollow fiber membrane comprising:
providing a polymethylpentene (PMP) polymer skin resin and a substrate resin, the substrate resin including one or more of polyethylene (PE), polypropylene (PP), polymethylpentene (PMP), and a combination thereof, wherein when the substrate resin includes PMP, the PMP polymer skin resin has a crystallinity that differs from a crystallinity of the PMP of the substrate resin;
co-extruding the PMP polymer skin resin and the substrate resin to form a hollow fiber membrane precursor; and
stretching the hollow fiber membrane precursor to form an asymmetric microporous hollow fiber membrane having a PMP polymer skin on a thermoplastic polymer substrate; and
wherein co-extruding the PMP polymer skin resin and the substrate resin to form a hollow fiber membrane precursor includes co-extruding the PMP polymer skin resin and the substrate resin through a co-extrusion die to form the hollow fiber membrane precursor.

14. The method of claim 13, wherein providing a polymethylpentene (PMP) polymer skin resin and a substrate resin includes providing the PMP polymer skin resin and the substrate resin exclusive of any oils for subsequent removal to form pores or any pore-forming particulate to facilitate pore formation.

15. A method of making a multi-layered hollow fiber membrane comprising the asymmetric microporous hollow fiber membrane of claim 13, wherein the PMP polymer skin comprises an outer layer and/or an inner layer of the multi-layered hollow fiber membrane.

* * * * *